Figure 7:
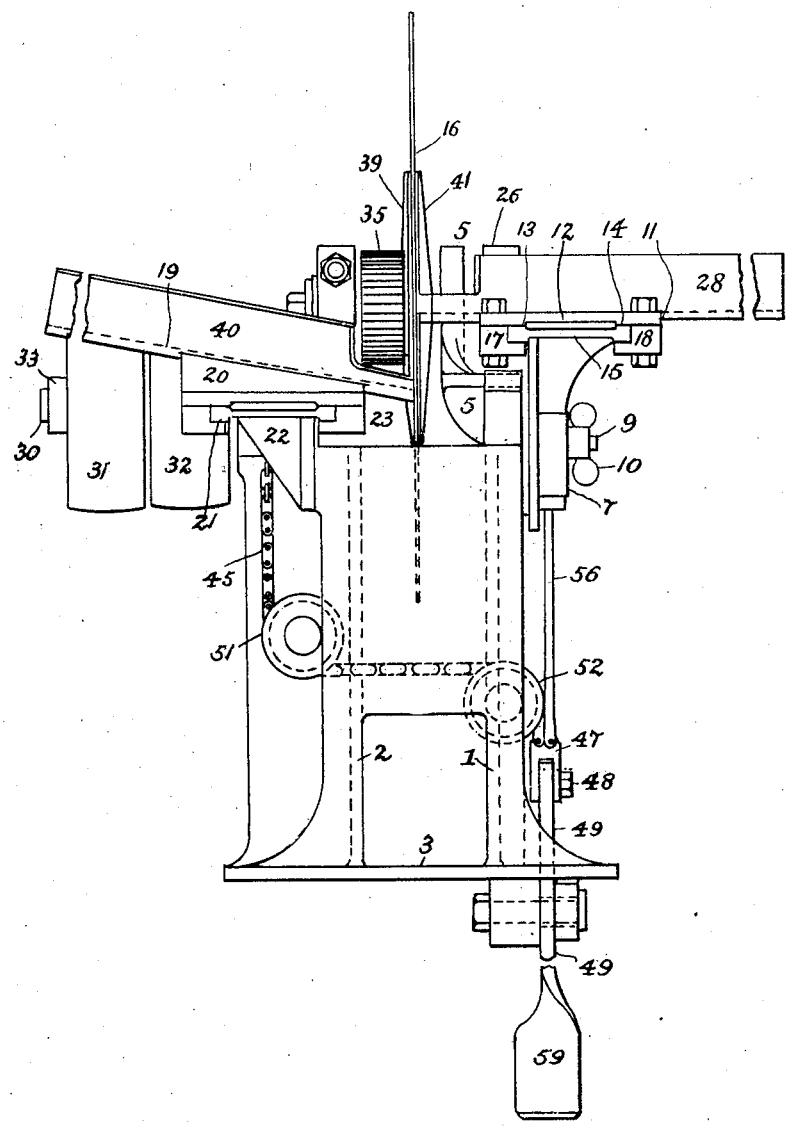

No. 786,539. PATENTED APR. 4, 1905.
R. WALES.
METHOD OF CUTTING MATERIAL FOR FORMING MITER OR BEVEL JOINTS.
APPLICATION FILED NOV. 24, 1903. RENEWED SEPT. 7, 1904.
5 SHEETS—SHEET 1.
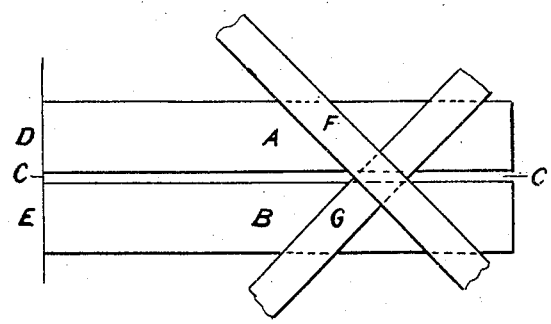
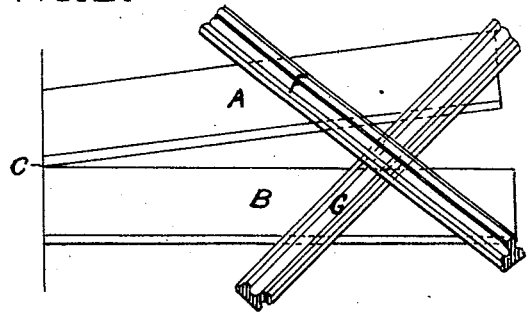
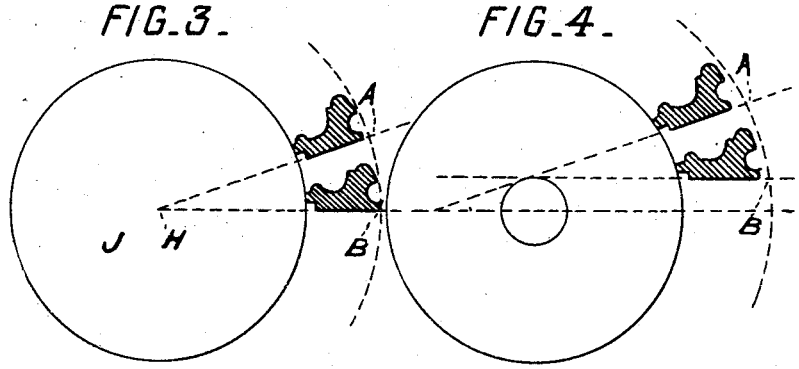
Witnesses:
E. B. Bolton
H. M. Kuehne
Inventor:
Robert Wales
By Richards
his Attorneys No. 786,539. PATENTED APR. 4, 1905.
R. WALES.
METHOD OF CUTTING MATERIAL FOR FORMING MITER OR BEVEL JOINTS.
APPLICATION FILED NOV. 24, 1903. RENEWED SEPT. 7, 1904.
5 SHEETS—SHEET 2.
FIG. 5.
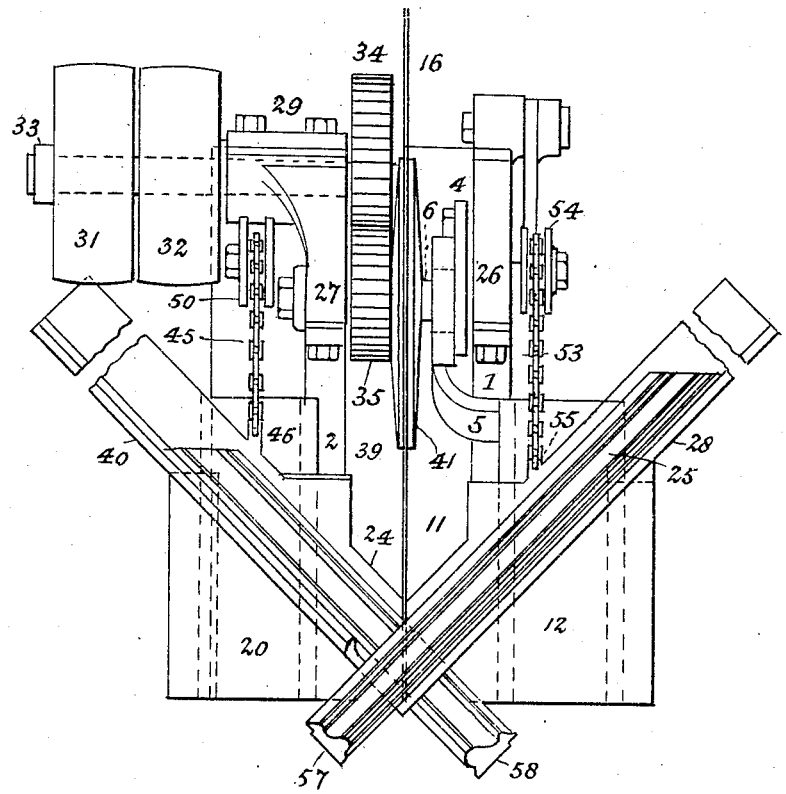
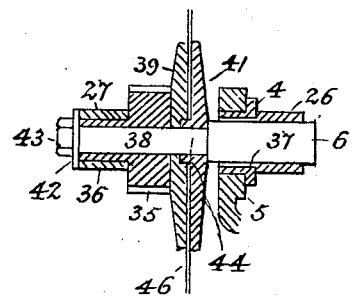
FIG. 6.
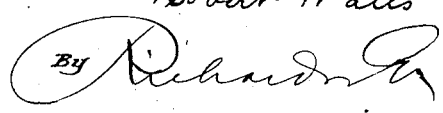

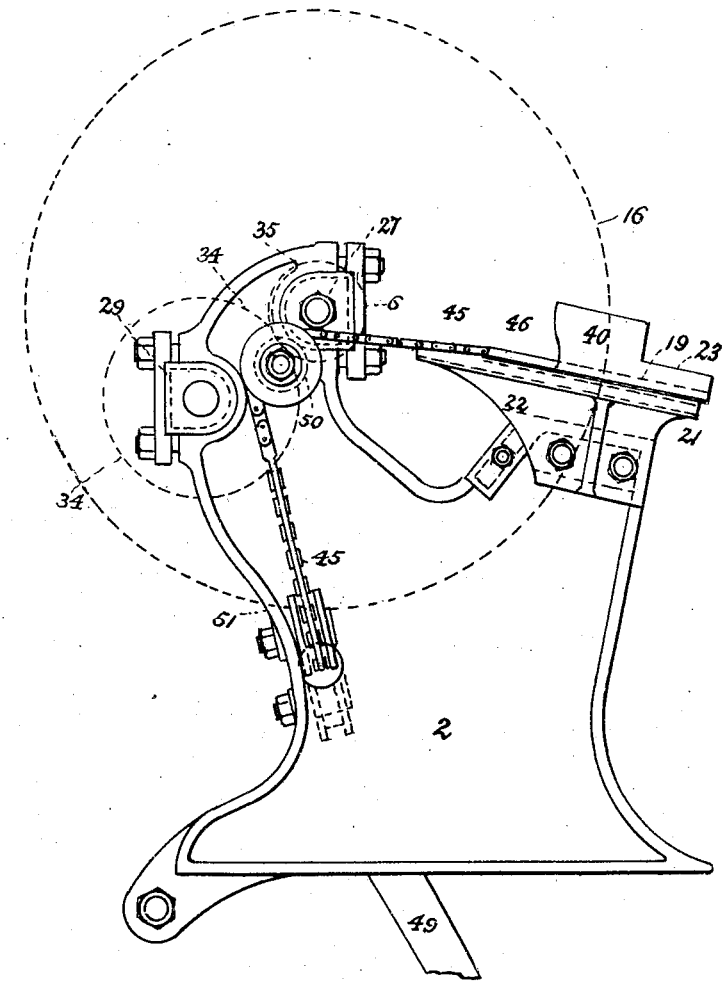

No. 786,539.

Patented April 4, 1905.

UNITED STATES PATENT OFFICE.

ROBERT WALES, OF DUNEDIN, NEW ZEALAND.

METHOD OF CUTTING MATERIAL FOR FORMING MITER OR BEVEL JOINTS.

SPECIFICATION forming part of Letters Patent No. 786,539, dated April 4, 1905.

Application filed November 24, 1903. Renewed September 7, 1904. Serial No. 223,656.

*To all whom it may concern:*

Be it known that I, ROBERT WALES, engineer, of 5 Commercial Chambers, Manse street, Dunedin, New Zealand, have invented a certain new and useful Method of Cutting Material to Form Miter or Bevel Joints, of which the following is a specification.

This invention relates to a method of cutting pieces of material, such as molding and the like, together in order to form miter or bevel joints when the cut ends of the pieces are joined together.

It is known that strips of material may be cut together so that the cut ends will match and form miter-joints by holding the strips crossing in parallel planes; but it has been considered impossible to cut strips of material together for the purpose described in any other way. I have, however, discovered that strips of material may be cut together so that the cut ends will match and form miter-joints by holding the strips crossing in planes not parallel, but divergent.

The principle of this invention may be broadly described by considering two supporting rectangular surfaces lying side by side in the same plane, but separated by a path for cutting means with a corresponding end of each surface in a straight line perpendicular to the path, said straight line being the axis for both the supporting-surfaces. If one of the supporting-surfaces be moved round the said axis, so that the supporting-surfaces become divergent, a strip of material may be held on one of the supporting-surfaces at an angle with the path, and another strip may be held on the other supporting-surface at an angle with said first strip and with the path, crossing the first strip at the path. Cutting means operating in the path in a plane perpendicular to the divergent supporting-surfaces will cut the strips together so that their cut ends will match and form a miter or bevel joint when placed together. In the case of a circular saw one strip of material is supported at an angle with the plane of said saw in a radial plane passing through the axis of the spindle of said saw or in a plane parallel to and equidistant from such radial plane, and another strip of material is supported at an angle with and crossing the first strip and on the other side of the plane of said saw in a different radial plane also passing through the axis of said spindle or in a plane parallel to and equidistant from such a radial plane, and the two strips are cut together simultaneously by moving the strips in said planes toward the saw-spindle. In other cases where a handsaw is used the strips are not moved, but are cut by the hand-saw being moved through them. In such cases the saw will not, however, pass through the strips simultaneously from the beginning to the end of the cut.

The accompanying drawings illustrate the method and also a machine for use with a circular saw in accordance with this invention. In the machine there are two rests at an angle with each other on each side of a conveniently located and operated circular saw. The supporting-surface of each rest is in a radial plane passing through the axis of the saw-spindle or in a plane parallel to and equidistant from such a radial plane, one or both of said rests being adapted to move in a circular path round said axis and both rests being mounted so as to have a simultaneous movement in their planes toward and from the axis of the saw-spindle. One strip of material is supported on one rest at a desired angle with and crossing closely above a second strip of material supported on the other rest, so that when the rests are moved toward the saw-spindle the saw commences to cut the two pieces of material at their edges simultaneously and traverses and passes out of them simultaneously, so that they will match and may be subsequently joined together at the cut ends to form a miter or bevel joint without any fitting.

Figure 8:
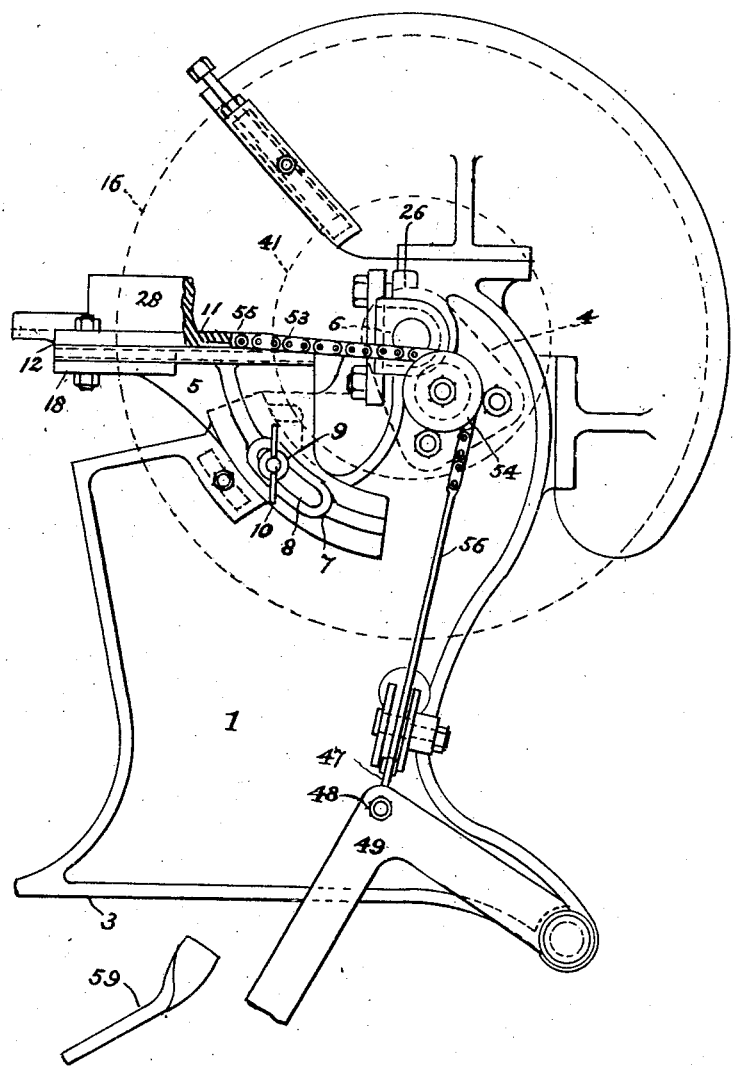

Figure 1 is a diagram for illustrating the method when divergent planes are used simply. Fig. 2 is a diagram giving a perspective view of Fig. 1 with the planes divergent. Fig. 3 is a diagram illustrating the method when divergent radial planes are used with a circular saw. Fig. 4 is a diagram illustrating the method when divergent planes parallel to and equidistant from radial planes are used with a circular saw. Fig. 5 is a plan of a machine with a circular saw. Fig. 6 is a part sectional view showing the arrangement of the saw-spindle and its bearings. Fig. 7 is a front elevation of the machine. Fig. 8 is a side elevation of the machine from the right, showing one rest adapted to be moved in a circular path. Fig. 9 is a side elevation of the machine from the left.

The same reference letters and numerals indicate the same or similar parts.

Figs. 1 and 2 are diagrams illustrating the method when divergent radial lines are used simply. In Fig. 1 the supporting-surfaces A B are shown lying side by side in the same plane, but separated by a path C for cutting means, having their ends D E in the same straight line, which is perpendicular to the said path and is also the axis upon which both supporting-surfaces may revolve. In Fig. 2 one of the supporting-surfaces A has been moved round said axis, so that the supporting-surfaces A B become divergent. A strip of material F may be held on the upper supporting-surface A at an angle with the path C, and another strip, G, may be held on the lower supporting-surface B at an angle with said first strip F and with the path C, the strips crossing each other at path C. Cutting means operate in the path C in a plane perpendicular to both the divergent supporting-surfaces and cut the strips together, but not quite simultaneously unless a circular saw is used with its spindle for the said axis to form a miter or bevel joint.

Fig. 3 is a diagram illustrating the method when divergent radial planes are used with a circular saw, a machine carrying out this method being illustrated in Figs. 5 to 9, inclusive. It will be seen from Fig. 3 that the divergent planes A B are radial—that is, when produced the ends will lie in a straight line passing through the axis H of the saw J perpendicular to the plane of the saw J, which lies between the planes A B, said plane of the saw being perpendicular to both divergent planes. In this case the circular saw will cut the strips simultaneously.

Fig. 4 is a diagram illustrating the method when divergent planes parallel to and equidistant from radial planes are used with a circular saw. It will be seen from Fig. 4 that the divergent planes A B when produced touch a cylinder whose axis is the axis of the said spindle, said axis being perpendicular to the plane of the saw, which plane is perpendicular to both divergent planes. In this case the circular saw will cut the strips simultaneously.

Following is a description of the machine used with a circular saw and illustrated in Figs. 5 to 9, inclusive, of the accompanying drawings: The main bracket of the machine consists of two cheeks 1 and 2, supported by a base 3. A bracket 4, bolted to the inside of the cheek 1, supports pivotally a guide-bracket 5, which is thus adapted to move in an arc of a circle round the axis of the saw-spindle 6. The guide-bracket 5 has a projecting quadrant 7, provided with a slot 8, engaging a pin 9, studded to the cheek 1 and carrying a wing-nut 10, so that the guide-bracket 5 may be secured in any desired position. A movable molding-rest 11, provided with a back or flange 28, has a lug 12 with its under surface machined and adapted to slide on opposing machined strips 13 14, placed parallel with the plane of the saw on a lug 15, which is integral with the guide-bracket 5. The molding-rest 11 is shown fixed at an angle of forty-five degrees with the plane of the saw 16, and its supporting-surface is in a radial plane passing through the axis of the saw-spindle. It has a parallel movement toward and from the saw by sliding on the machined strips 13 14, and it is prevented from being displaced laterally by guide-bars 17 and 18, which embrace said machined strips and are secured to the lug 12. The molding-rest 11 has also by its connection with the pivotally-supported bracket 5 a movement in an arc of a circle round the axis of the saw-spindle. A second molding-rest 19, provided with a back or flange 40, shown as not movable in a circular path, has a lug 20 attached thereto similar to the lug 12, that is attached to the rest 11. The under surface of the lug 20 is machined and is adapted to slide on opposing machined strips placed parallel with the plane of the saw on a lug 21, integral with a supporting-bracket 22, secured to the outside of the cheek 2. The molding-rest 19 is shown fixed at an angle of forty-five degrees with the plane of the saw 16 and at an angle of ninety degrees with the movable molding-rest 11 and with its supporting-surface in a radial plane passing through the axis of the saw-spindle. The molding-rest 19 has also a parallel movement toward and from the saw, being adapted to slide on the machined strips referred to, and it is prevented from being displaced laterally by guide-bars embracing said strips and secured to the lug 20, as before described in the case of the molding-rest 11. The flange 40 of the molding-rest 19 has a piece cut out of its inner end 23 for the purpose of allowing a molding 25, lying on the movable molding-rest 11, to cross above a molding 24, lying on the molding-rest 19. The bearings 26 and 27 for the saw-spindle 6, respectively mounted on the cheeks 1 and 2, are provided with the usual brass bushes and covers. A second bearing 29, constructed similarly to the bearings 26 and 27, is attached to the cheek 2 of the main bracket, so that the machine may be driven from the left side. A similar bearing may also be attached in a similar position on the cheek 1, so that the machine may be driven from the right side, if so desired. A spindle 30, supported by the bearing 29, has a pulley 31 adapted to run loose on it and has also a second pulley 32 keyed on it. A collar 33 keeps the loose pulley 31 in position. A spur-wheel 34, Fig. 1, is keyed on the inner end of the spindle 30 in a position that will permit it to gear with a pinion 35, which is mounted on and secured to the saw-spindle 6.

The arrangement of the saw-spindle 6 and its bearings is illustrated in Fig. 2 and is as follows: A boss 36, integral with the pinion 35, forms a journal for and is supported by and rotates in the bearing 27. The saw-spindle 6 is formed, preferably, with one portion 37 of larger diameter than the remaining portion 38. A saw-collar 39, circular saw 16, a second saw-collar 41, and pinion 35 are fitted to the portion 38 of the saw-spindle of smaller diameter. The saw-collars 39 and 41, the saw 16, and the pinion 35 are secured, by means of a washer 42 and nut 43, on the end of the saw-spindle against a shoulder 44, formed at the junction of the two portions of the saw-spindle 6. The portion 37 of the saw-spindle of larger diameter forms a journal which is supported by and rotates on the bearing 26. By these arrangements the saw-spindle 6 can be readily withdrawn by removing the nut 43, and the saw can be then taken out for setting or other purposes and the same saw or one of different diameter can also be readily replaced. The saw is only used a short distance from its circumference by reason of the moldings rapidly approaching each other as the rests are moved toward the saw-spindle, and this permits larger collars 39 and 41 to be used for the purposes of reducing the wabbling of the saw when in motion.

The rests may be moved toward the saw by hand or in order to secure simultaneous movement by the following means: A chain 45 has one of its ends 46 attached to the molding-rest 19 and its other end attached to a shackle 47, which is secured, by means of the bolt 48, to a foot-lever 49. The chain 45 is supported by and is adapted to slide over pulleys 50, 51, and 52, suitably placed on the cheeks. A second chain 53, supported by and adapted to slide over a pulley 54, has one of its ends 55 attached to the molding-rest 11 and its other end attached to a rod 56. The lower end of the rod 56 is secured to the shackle 47.

In operation a molding 24 is placed on the molding-rest 19 with an end 58 projecting past the plane of the saw, and the movable molding-rest 11 is moved in an arc and clamped at such a distance from the molding-rest 19 as will enable a second molding 25, placed on the rest 11, to lie in the opening 23 at the inner end of the flange of the molding-rest 19, with its end 57 crossing the end 58 of the molding 24. When pressure is put on the foot-piece 59 of the lever 49 the molding-rests will be drawn forward toward the saw simultaneously, with their supporting-surfaces in radial planes passing through the axis of the saw-spindle and also so that any point on either rest will move in a plane parallel to the plane of the saw. The rests may be drawn back by hand to their starting position.

Having now described my invention, what I claim as new, and desire to secure by Letters Patent, is—

1. The herein-described method of cutting material to form a miter or bevel joint which consists in holding two strips of material, crossed and in divergent horizontal and divergent vertical planes, and cutting said strips simultaneously, substantially as described.

2. Method of cutting material to form a miter-joint, which consists in holding two strips of the material crossed in two divergent radial planes one on each side of a circular saw, both planes passing through the axis of the saw-spindle and cutting the strips simultaneously together substantially as described.

3. The herein-described improvement in the art of making miter-joints which consists in arranging two pieces to be miter-jointed together in divergent horizontal and divergent vertical planes and so as to cross each other, and passing a dividing-blade through them at the crossing-line whereby each piece in the joint will be the exact counterpart of the opposed piece and then uniting such pieces to each other on the line of division, substantially as described.

In witness whereof I have hereunto set my hand in presence of two witnesses.

ROBERT WALES.

Witnesses:
   A. J. PARK,
   J. R. PARK.